United States Patent
Lim et al.

(10) Patent No.: US 11,020,947 B2
(45) Date of Patent: Jun. 1, 2021

(54) THERMO-SHRINKABLE POLYESTER FILM

(71) Applicant: SK CHEMICALS CO., LTD., Gyeonggi-do (KR)

(72) Inventors: Seol-Hee Lim, Seoul (KR); Sung-Gi Kim, Gyeonggi-do (KR)

(73) Assignee: SK Chemicals Co., Ltd., Seongnam (KR)

( * ) Notice: Subject to any disclaimer, the term of this patent is extended or adjusted under 35 U.S.C. 154(b) by 208 days.

(21) Appl. No.: 15/504,595

(22) PCT Filed: Jul. 17, 2015

(86) PCT No.: PCT/KR2015/007460
§ 371 (c)(1),
(2) Date: Feb. 16, 2017

(87) PCT Pub. No.: WO2016/027994
PCT Pub. Date: Feb. 25, 2016

(65) Prior Publication Data
US 2017/0232721 A1    Aug. 17, 2017

(30) Foreign Application Priority Data
Aug. 19, 2014 (KR) .................. 10-2014-0107738

(51) Int. Cl.
| | | |
|---|---|---|
| *B32B 27/36* | (2006.01) | |
| *C08J 5/18* | (2006.01) | |
| *C08L 67/02* | (2006.01) | |
| *C08K 5/00* | (2006.01) | |
| *B32B 27/18* | (2006.01) | |
| *C08G 63/199* | (2006.01) | |
| *B32B 27/08* | (2006.01) | |
| *C08G 63/60* | (2006.01) | |

(52) U.S. Cl.
CPC .............. *B32B 27/36* (2013.01); *B32B 27/08* (2013.01); *B32B 27/18* (2013.01); *C08G 63/199* (2013.01); *C08G 63/60* (2013.01); *C08J 5/18* (2013.01); *C08K 5/00* (2013.01); *C08L 67/02* (2013.01); *B32B 2250/02* (2013.01); *B32B 2307/516* (2013.01); *B32B 2307/71* (2013.01); *B32B 2307/736* (2013.01); *B32B 2309/105* (2013.01); *B32B 2519/00* (2013.01)

(58) Field of Classification Search
CPC ................................. B32B 27/08; B32B 27/36
See application file for complete search history.

(56) References Cited

U.S. PATENT DOCUMENTS

| | | | |
|---|---|---|---|
| 2005/0124779 A1 | 6/2005 | Shelby et al. | |
| 2007/0104931 A1* | 5/2007 | Ito ................. | B29C 61/003 |
| | | | 428/220 |
| 2009/0202851 A1* | 8/2009 | Maruichi ........... | B32B 27/08 |
| | | | 428/483 |
| 2012/0226014 A1 | 9/2012 | Lee et al. | |
| 2012/0329980 A1 | 12/2012 | George et al. | |
| 2013/0224412 A1* | 8/2013 | Muta ............... | B32B 27/302 |
| | | | 428/35.7 |
| 2014/0018497 A1 | 1/2014 | Lee et al. | |
| 2016/0068629 A1 | 3/2016 | Lim | |

FOREIGN PATENT DOCUMENTS

| | | |
|---|---|---|
| JP | 2003-049006 | 2/2003 |
| JP | 2006-233092 | 9/2006 |
| JP | 2012-041546 | 3/2012 |
| KR | 10-2010-0013012 A | 2/2010 |
| KR | 10-2010-0060850 A | 6/2010 |
| KR | 10-2011-0052890 | 5/2011 |
| KR | 10-2012-0077032 A | 7/2012 |
| KR | 10-2013-0015931 A | 2/2013 |
| KR | 10-2014-0092113 A | 7/2014 |
| WO | WO 2014/204156 | 12/2014 |

OTHER PUBLICATIONS

International Search Report prepared by the Korean International Property Office dated Oct. 27, 2015, for International Application No. PCT/KR2015/007460.
Extended Search Report for European Patent Application No. 15833334.4, dated Mar. 8, 2018, 8 pages.

* cited by examiner

*Primary Examiner* — Zachary M Davis
(74) *Attorney, Agent, or Firm* — Sheridan Ross PC

(57) ABSTRACT

This disclosure relates to a thermo-shrinkable polyester film with excellent UV absorbance and heat resistance. According to one embodiment of the invention, provided is a thermo-shrinkable polyester film comprising a first resin layer comprising polyester resin comprising residues of dicarboxylic acid components comprising aromatic dicarboxylic acid, and residues of diol components comprising 4-(hydroxymethyl)cyclohexylmethyl 4'-(hydroxymethyl)cyclohexanecarboxylate, and 4,4-(oxybis(methylene)bis)cyclohexane methanol; and a second resin layer comprising the polyester resin and a UV absorber, formed on at least one side of the first layer.

6 Claims, No Drawings

THERMO-SHRINKABLE POLYESTER FILM

CROSS REFERENCE TO RELATED APPLICATIONS

This application is a national stage application under 35 U.S.C. 371 and claims the benefit of PCT Application No. PCT/KR2015/007460 having an international filing date of 17 Jul. 2015, which designated the United States, which PCT application claimed the benefit of Korean Patent Application No. 10-2014-0107738 filed 19 Aug. 2014, the disclosures of each of which are incorporated herein by reference.

TECHNICAL FIELD

The present invention relates to a thermo-shrinkable polyester film. More particularly, the present invention relates to a thermo-shrinkable polyester film with excellent UV absorbance and heat resistance.

BACKGROUND OF ART

A thermo-shrinkable film is used for labels of plastic, glass bottles, batteries or electrolytic condensers, coating of whole packaging container, shrink packages, shrink labels, and the like. As the thermo-shrinkable film, polyvinyl chloride (PVC), polystyrene, polypropylene, polyester-based plastic films and the like are being used.

However, a film made of polyvinyl chloride is classified as environmentally restricted substance because it generates hydrogen chloride gas and dioxin-like substances, and the like, when incinerated, and if the film is used as a shrink label of a PET container and the like, it causes inconvenience of separately collecting the label and the container so as to recycle the container.

And, although a polystyrene-based film has good operation stability resulting from a shrinking process and satisfactory appearance of the product, ink of a special composition should be used when printing due to poor chemical resistance. Furthermore, it has a disadvantage of insufficient storage stability at room temperature, thus causing dimensional change such as shrink by itself, and the like.

Thereby, there is a tendency of increase in the use amount of shrink labels that do not have the problems of PVC, and polystyrene-based films such as environmental impact, chemical resistance, and the like, and yet, do not require a label separation process when recycled as the use amount of PET containers increases.

Meanwhile, if medicines or high functional products, etc. are exposed to UV, the contents may be spoiled or shelf life of the contents may be shortened, and when a film is attached to a container and then high temperature contents are injected, the formed film label may be modified. Thus, fundamental improvement in packaging material that can solve these problems is required.

DETAILED DESCRIPTION OF THE INVENTION

Technical Problem

It is an object of the invention to provide a thermo-shrinkable polyester film that has excellent UV absorbance and excellent shrinkage, and can be thermally shrunken at low temperature.

Technical Solution

The present invention provides a thermo-shrinkable polyester film comprising a first resin layer comprising polyester resin comprising residues of dicarboxylic acid components comprising aromatic dicarboxylic acid, and residues of diol components comprising 4-(hydroxymethyl)cyclohexylmethyl 4'-(hydroxymethyl)cyclohexanecarboxylate, and 4,4-(oxybis (methylene)bis)cyclohexane methanol; and a second resin layer comprising the polyester resin and a UV absorber, formed on at least one side of the first layer.

Hereinafter, a thermo-shrinkable polyester film according to specific embodiment of the invention will be explained in detail.

According to one embodiment of the invention, provided is a thermo-shrinkable polyester film comprising a first resin layer comprising polyester resin comprising residues of dicarboxylic acid components comprising aromatic dicarboxylic acid, and residues of diol components comprising 4-(hydroxymethyl)cyclohexylmethyl 4'-(hydroxymethyl)cyclohexanecarboxylate, and 4,4-(oxybis(methylene)bis)cyclohexane methanol; and a second resin layer comprising the polyester resin and a UV absorber, formed on at least one side of the first layer.

Previously, there were problems in that if medicines or high functional products, etc. are exposed to UV, the contents may be spoiled or shelf life of the contents may be shortened, and when a film is attached to a container and then high temperature contents are injected, the formed film label may be modified.

Thus, the inventors confirmed through experiments that by including a first resin layer comprising polyester resin comprising residues of dicarboxylic acid components comprising aromatic dicarboxylic acid, and residues of diol components comprising 4-(hydroxymethyl)cyclohexylmethyl 4'-(hydroxymethyl)cyclohexanecarboxylate, and 4,4-(oxybis(methylene)bis)cyclohexane methanol; and a second resin layer comprising the polyester resin and a UV absorber, formed on at least one side of the first layer, a thermo-shrinkable polyester film with excellent heat resistance and UV absorbance may be provided, and completed the invention.

The thermo-shrinkable polyester film comprises a first resin layer comprising polyester resin, and a second resin layer comprising the polyester resin and a UV absorber, formed on at least one side of the first resin layer, wherein the second layer may be laminated on one side or both sides of the first resin layer.

And, the thickness of the total thermo-shrinkable polyester film may be 10 µm to 1 mm, and the thickness of the second resin layer may be 10 nm to 10 µm. It is preferable in terms of cost and performance that the thickness of the second resin layer is within the above range.

As used herein, the term 'residue' means a certain part or unit that is included in the product of a chemical reaction and is derived from a specific compound, when the specific compound participates in the chemical reaction. For example, the 'residue' of a dicarboxylic acid component; or 'residue' of a diol component respectively means a part derived from the dicarboxylic acid component or diol component in polyester formed by esterification or polycondensation.

The diol component used for the synthesis of polyester resin may include 4-(hydroxymethyl)cyclohexylmethyl 4'-(hydroxymethyl)cyclohexanecarboxylate, and 4,4-(oxybis(methylene)bis) cyclohexane methanol. The 4-(hydroxymethyl)cyclohexylmethyl 4'-(hydroxymethyl) cyclohexanecarboxylate is represented by the following Chemical Formula 1, and the 4,4-(oxybis(methylene)bis) cyclohexane methanol is represented by the following Chemical Formula 2.

[Chemical Formula 1]

[Chemical Formula 2]

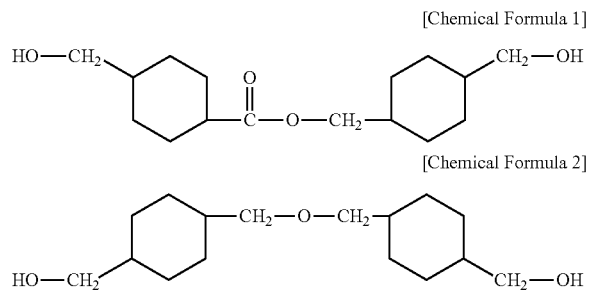

Particularly, the residual stress of the 4-(hydroxymethyl) cyclohexylmethyl 4'-(hydroxymethyl)cyclohexanecarboxylate, and 4,4-(oxybis(methylene)bis) cyclohexane methanol increase according to stretching, and thus, when calories are supplied, shrinking force may increase due to resolution of residual stress. Thus, by using the compounds as diol components, a thermo-shrinkable film with excellent shrinkage may be prepared.

And, the 4-(hydroxymethyl)cyclohexylmethyl 4'-(hydroxymethyl)cyclohexanecarboxylate, and 4,4-(oxybis (methylene)bis)cyclohexane methanol may be respectively included in the content of 0.1 to 20 mol %, based on 100 mol % of the dicarboxylic acid component, and preferably, the 4-(hydroxymethyl)cyclohexylmethyl 4'-(hydroxymethyl) cyclohexanecarboxylate may be included in the content of 0.1 to 10 mol %, and the 4,4-(oxybis(methylene)bis)cyclohexane methanol may be included in the content of 0.1 to 10 mol %. If the content of each diol component is too small, it may be difficult to confirm shrinkage improvement effect, and if it is too large, whitening may occur due to overstretching, thus decreasing availability as a thermo-shrinkable film.

And, the diol components may further comprise other diol components, in addition to the 4-(hydroxymethyl)cyclohexylmethyl 4'-(hydroxymethyl)cyclohexanecarboxylate, and 4,4-(oxybis(methylene)bis)cyclohexane methanol. The other diol components mean diol components excluding the 4-(hydroxymethyl)cyclohexylmethyl 4'-(hydroxymethyl) cyclohexanecarboxylate, and 4,4-(oxybis(methylene)bis)cyclohexane methanol, and for example, may be aliphatic diol, aromatic diol or a mixture thereof.

The aromatic diol may include a C8-40, preferably C8-33 aromatic diol compound. The examples of the aromatic diol compound may include bisphenol A derivative added with ethylene oxide and/or propylene oxide such as polyoxyethylene-(2.0)-2,2-bis(4-hydroxyphenyl) propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, and the like (polyoxyethylene-(n)-2,2-bis(4-hydroxyphenyl)propane, polyoxypropylene-(n)-2, 2-bis(4-hydroxyphenyl)propane or polyoxypropylene-(n)-polyoxyethylene-(n)-2,2-bis(4-hydroxyphenyl)propane, and the like), but are not limited thereto. The n represents the number of polyoxyethylene or polyoxypropylene unit.

And, the aliphatic diol may include a C2-30 aliphatic diol compound. The examples of the aliphatic diol compound may include linear, branched or cyclic aliphatic diol componenst such as diethyleneglycol, triethyleneglycol, propanediol(1,2-propanediol, 1,3-propanediol, and the like), 1,4-butanediol, pentanediol, hexanediol(1,6-hexanediol and the like), neopentyl glycol(2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol, and the like, but are not limited thereto.

Among the other diol components as explained above, if 1,4-cyclohexanedimethanol, diethyleneglycol, ethyleneglycol or a mixture thereof is included, properties such as chemical resistance, drug resistance as well as heat resistance of the prepared polyester resin may be improved, and thus, they are more preferable. And, based on 100 mol % of the dicarboxylic acid compound, the 1,4-cyclohexanedimethanol may be included in the content of 0.1 to 15 mol %, the diethyleneglycol may be included in the content of 1 to 20 mol %, or 2 to 15 mol %, and the content of the ethyleneglycol may be adjusted such that the total content of diol components may be 100 mol %, within the range that does not specifically degrade properties, and it may be included in the content of about 30 to 95 mol %.

And, in the polyester resin, the 'dicarboxylic acid component' means to include aromatic dicarboxylic acid such as terephthalic acid and the like, alkyl ester thereof (C1-4 lower alkyl ester such as monomethyl, monoethyl, dimehtyl, diethyl or dibutylester and the like) and/or acid anhydride thereof, and it may react with the diol component to form a dicarboxylic acid moiety.

Wherein, the dicarboxylic acid component may include aromatic dicarboxylic acid, and the aromatic dicarboxylci acid component may be C8-20, preferably C8-14 aromatic dicarboxylic acid or a mixture thereof, and the like.

More specifically, the aromatic dicarboxylic acid may include at least one compound selected from the group consisting of terephthalic acid, dimethyl terephthalate, cycloaliphatic dicarboxylic acid, isophthalic acid, adipic acid, azelaic acid, naphthalenedicarboxylic acid, and succinic acid.

Meanwhile, the UV absorber included in the second resin layer may include at least one selected from the group consisting of benzotriazole, benzophenone, salycylate, cyanoacrylate, oxanilide, and hindered amine light stabilizer (HALS).

As the UV absorber, various organic UV absorbers as explained above may be used, but component with wide UV absorption wavelength range may be more effective. If the molecular weight of the UV absorber component is small, although the initial UV absorption capacity is excellent, it may be easily extracted and volatilized and the capacity may rapidly decrease. And, if the molecular weight is large, although there is a difficulty in forming due to low flowability of the high molecular weight material and the initial UV shielding effect is somewhat low compared to low molecular weight material, it has excellent long term capacity. In the case of the thermo-shrinkable polyester film according to one embodiment, it is appropriate that additives with wide UV absorption wavelength range to long wavelength area and high molecular weight are used, and particularly, benzotriazole-based components with high molecular weight are more appropriate.

And, the UV absorber may be included in the content of 0.1 to 3 wt %, more preferably 0.1 to 0.8 wt % in the second resin layer. If the content of the UV absorber is less than 0.1 wt %, manifestation of UV shielding effect may be insufficient, and if the content is greater than 3 wt %, molecular weight may decrease to significantly degrade physical properties, and the UV absorber component may be exposed outside.

And, the second resin layer may further comprise at least one kind of additives selected from the group consisting of an antioxidant, a heat stabilizer, a release agent, an agent for applying electrostatic force, an anti-sticking agent, and an impact modifier, but the content thereof may be preferably 1 wt % or less.

Meanwhile, the thermo-shrinkable polyester film according to one embodiment may have light transmittance of 10% or less at a wavelength of 360 nm or less and light transmittance of 60% or more at a wavelength of 400 nm, and delta E of 1 or less when exposed to UVA (320~400 nm) wavelength for 500 hours.

And, the thermo-shrinkable polyester film may have shrink onset temperature of 65° C. or less, preferably 55 to 65° C., and maximum shrinkage at 65° C. of less than 50%, preferably 35% or less, and maximum shrinkage at 90 to 100° C. of 55 to 90%, preferably 65 to 85%. If the shrink onset temperature does not fall within the above range, there is a concern that the film may be modified at room temperature. And, if the maximum heat shrinkage at 65° C. does not fall within the above range, the label may be non-uniformly modified and shrunken, and if the maximum heat shrinkage at 90 to 100° C. does not fall within the above range, the thermo-shrinkable film may not be sufficiently formed (shrunken), and it cannot be used for a label, cap seal of a container, and the like, or direct packaging, and the like.

As such, since the thermo-shrinkable polyester film according to one embodiment comprises a resin layer including a UV absorber, it may effectively protect the contents from UV, and since it has excellent heat resistance, it may prevent modification or shrinking of the film when high temperature material is injected into a container to which the thermo-shrinkable film is attached.

Meanwhile, the thermo-shrinkable polyester film may be prepared by extrusion blowing of the polyester resin, or stretching 3 to 6 times in a TD (Transverse Direction) using a stretching and extruding machine. The preparation method of the thermo-shrinkable polyester film will be more specifically explained below.

The preparation method of the thermo-shrinkable polyester film may comprise the steps of: conducting an esterification reaction of dicarboxylic acid components comprising aromatic dicarboxylic acid with diol components comprising 4-(hydroxymethyl)cyclohexylmethyl 4'-(hydroxymethyl)cyclohexanecarboxylate, and 4,4-(oxybis(methylene)bis)cyclohexane methanol, and polycondensing the esterification product to prepare polyester resin; preparing a composition comprising a resin chip prepared identically to the polyester resin chip, and a UV absorber; and co-extruding the respectively prepared polyester resin and composition to prepare a non-stretched film, and stretching or blowing the non-stretched film.

For the dicarboxylic acid component, diol component, UV absorber, other additives, and the like, those explained in the thermo-shrinkable polyester film according to one embodiment may be applied without limitations.

Meanwhile, the polyester resin and the composition may be prepared in appropriate forms such as a chip or a pellet and the like, for appropriate progression of co-extrusion.

And, the stretching may be conducted 3 to 6 times in a Transverse Direction, preferably using extrusion blowing or biaxial stretching and extruding machine.

Meanwhile, the esterification reaction step required to prepare polyester resin may be conducted by reacting dicarboyxlic acid components and diol components at a temperature of 150 to 300° C. and a pressure of 0 to 10.0 kg/cm². The esterification reaction conditions may be appropriately adjusted according to specific properties of prepared polyester, the mole ratio of dicarboxylic acid components and glycol, or process conditions and the like. Specifically, preferable examples of the esterification reaction conditions may include a pressure of 0 to 5.0 kg/cm², more preferably 0.1 to 3.0 kg/cm²; a temperature of 200 to 270° C., more preferably 240 to 260° C.

And, the esterification reaction may be conducted batchwise or continuously, and each raw material may be separately introduced, but it is preferable that slurry including diol components and dicarboxylic acid components is introduced.

Next, the step of polycondensation of the esterification product may comprise reacting the esterification product of dicarboyxlic acid components and diol components at a temperature of 150 to 300° C. and reduced pressure of 600 to 0.01 mmHg for 1 to 24 hours.

The polycondensation may be conducted at a temperature of 150 to 300° C., preferably 200 to 290° C., more preferably 260 to 280° C.; and reduced pressure of 400 to 0.01 mmHg, preferably 200 to 0.05 mmHg, more preferably 100 to 0.1 mmHg.

By applying reduced pressure conditions, glycol, by-product of the polycondensation, may be removed outside the system, and if the polycondensation is conducted outside the reduced pressure of 400 to 0.01 mmHg, removal of by-products may be insufficient.

And, in case the polycondensation is conducted outside the temperature range of 150 to 300° C., if the polycondensation is progressed at 150° C. or less, by-product of polycondensation, glycol may not be effectively removed outside the system, to lower the intrinsic viscosity of the final reaction product, thus degrading properties of the prepared polyester resin, and if it is progressed at 300° C. or more, there is a high possibility of yellowing of the prepared polyester resin. And, the polycondensation may be progressed for a time required to reach optimum intrinsic viscosity of the final reaction product, for example, for an average residence time of 1 to 24 hours.

Meanwhile, the preparation method may further comprise a step of adding polycondensation catalyst. The polycondensation catalyst may be added to the product of esterification reaction or ester exchange reaction before the initiation of the polycondensation reaction, added on the slurry including diol components and dicarboxylic acid components before the esterification reaction, or added during the esterification reaction step.

As the polycondensation catalyst, titanium, germanium and antimony compounds, and the like may be used, but not limited thereto.

The titanium-based catalyst is used as a catalyst for polycondensation of polyester resin prepared by copolymerizing 15 wt % or more of cyclohexandimethanol derivatives with terephthalic acid, and it has advantages in that even a small amount compared to the antimony-based catalyst enables reaction, and it is inexpensive compared to the germanium-based catalyst.

Specific examples of the titanium-based catalyst may include tetraethyl titante, acetyltripropyl titanate, tetrapropyl titanate, tetrabutyl titanate, tetrbutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, co-precipitate of titanium dioxide and silicon dioxide, and co-precipitate of titanium dioxide and zirconium dioxide, and the like.

Wherein, since the amount of the polycondensation catalyst used influences on the color of the final polymer, it may vary according to a desired color, and a stabilizer and a coloring agent used, but preferably, the amount is 1 to 100 ppm based on the amount of titanium to the weight of the final polymer, more preferably 1 to 50 ppm, and preferably 10 ppm or less based on the amount of silicon. If the amount of titanium is less than 1 ppm, a desired polymerization degree cannot be achieved, and if it is greater than 100 ppm, the color of the final polymer may be yellowed, and thus, a desired color cannot be obtained.

And, as other additives, a stabilizer and a coloring agent and the like may be used. The stabilizer that can be used in the present invention may include phorphoric acid, trimethylphosphate, triethylphosphate, triethylphosphonoacetate and the like, and the added amount is preferably 10 to 100 ppm, based on the amount of phosphorous to the weight of the final polymer. If the added amount of the stabilizer is less than 10 ppm, it is difficult to obtain a desired bright color, and if it is 100 ppm or more, a desired high polymerization degree cannot be achieved.

And, the coloring agent that can be used to improve color in the present invention may include cobalt acetate and cobalt propionate, and the like, and the added amount is preferably 100 ppm or less to the weight of the final polymer. In addition to the above coloring agents, previously known organic compounds may be used as a coloring agent.

Advantageous Effects

The thermo-shrinkable polyester film comprises a resin layer comprising a UV absorber, thereby effectively protecting the contents from UV, and has low UV absorber content compared to a monolayer thermo-shrinkable film including a UV absorber, and thus, the production cost is low.

And, since the thermo-shrinkable polyester film according to the present invention has excellent heat resistance, modification or shrinking of the film may be prevented when high temperature material is injected into a container to which the thermo-shrinkable film is attached.

DETAILED DESCRIPTION OF THE EMBODIMENTS

The present invention will be explained in detail in the following Examples. However, these examples are only to illustrate the invention, and the scope of the invention is not limited thereto.

Preparation Example 1: Preparation of Polyester Resin

Each 100 moles of dicarboxylic acid component and diol component were introduced into a 3 kg batch reactor and mixed, and temperature was gradually raised to 255° C. to progress esterification reaction. Wherein, as the dicarboyxlic acid component, 100 moles of terephthalic acid was introduced, and as the diol component, 2 moles of 4-(hydroxymethyl) cyclohexanecarboxylic acid, 6 moles of 4,4-(oxybis (methylene)bis) cyclohexane methanol, 5 moles of 1,4-cyclohexanedimethanol, 10 moles of diethyleneglycol, and the remaining amount of ethyleneglycol were introduced.

Wherein, generated water was discharged outside of the system, and when the generation and discharging of water was finished, the reactant was transferred to a polycondensation reactor equipped with a stirrer, a cooling condenser and vacuum system.

After adding 0.5 g of tetrabutyl titanate, 0.4 g of triethylphosphate and 0.5 g of cobalt acetate to the esterification product, while the internal temperature of the reactor was raised from 240° C. to 275° C. and the pressure was primarily reduced from atmospheric pressure to 50 mmHg, ethyleneglycol was taken out by low vacuum reaction for 40 minutes, and then, the pressure was gradually reduced again to 0.1 mmHg, polycondensation was progressed under high vacuum until target intrinsic viscosity was achieved, and the product was discharged to prepare polyester resin chip.

Preparation Example 2: Preparation of Polyester Resin Chip

Polyester resin was prepared by the same method as Example 1, except that as the diol component, 8 moles of 4-(hydroxymethyl) cyclohexane carboxylic acid, 2 moles of 4,4-(oxybis(methylene)bis)cyclohexane methanol, 10 moles of 1,4-cyclohexanedimethanol, 10 moles of diethyleneglycol, and the remaining amount of ethyleneglycol were introduced.

Preparation Example 3: Preparation of Polyester Resin Including UV Absorber

To the resin prepared according to Preparation Example 1, a UV absorber was melt-mixed in an extruder at 1 to 10 phr, to prepare a polyester resin composition including polyester resin and a UV absorber in the form of a master chip.

Preparation Example 4: Preparation of Polyester Resin Including UV Absorber

To the resin prepared according to Preparation Example 2, a UV absorber was melt-mixed in an extruder at 1 to 10 phr, to prepare a polyester resin composition including polyester resin and a UV absorber in the form of a master chip Example 1: Preparation of Bilayered Thermo-Shrinkable Polyester Film The master chip of the composition prepared according to Preparation Example 3, and the resin prepared according to Preparation Example 1 were molten at 260 to 290° C. and co-extruded from a T die, and then, quenched in a cooling roller to obtain a non-stretched film. The obtained non-stretched film was stretched 3 to 6 times in a transverse direction at a stretching temperature of 75 to 90° C., at a stretching speed of 60 mm/sec, to obtain a thermo-shrinkable polyester film.

Example 2: Preparation of Bilayered Thermo-Shrinkable Polyester Film

A thermo-shrinkable polyester film was obtained by the same method as Example 1, except that the master chip of the composition prepared according to Preparation Example 3 and the resin prepared according to Preparation Example 2 were co-extruded.

Example 3: Preparation of Three-Layered Thermo-Shrinkable Polyester Film

On both side of the resin prepared according to Preparation Example 2, the composition prepared according to Preparation Example 3 were positioned, and they were molten at 260 to 290° C. and co-extruded from a T die, and then, quenched in a cooling roller to obtain a non-stretched film. Thereafter, a stretching process was progressed by the same method as Example 1, to prepare a three-layered thermo-shrinkable film having second resin layers including UV absorber respectively formed on both sides of the first resin layer.

Comparative Example 1

A thermo-shrinkable polyester film was obtained by the same method as Example 1, except that only the resin prepared according to Preparation Example 1 was extruded.

Comparative Example 2

A thermo-shrinkable polyester film was obtained by the same method as Example 1, except that only the resin prepared according to Preparation Example 2 was extruded.

Comparative Example 3

A polyester resin chip was obtained by the same method as Preparation Example 1, except that as the diol components, 10 moles of 1,4-cyclohexanedimethanol, 10 moles of diethyleneglycol, and 80 moles of ethyleneglycol were used.

The polyester resin chip was molten at 260 to 290° C., and extruded from a T die, and then, quenched in a cooling roller to obtain a non-stretched film. The obtained non-stretched film was stretched 3 to 6 times in a transverse direction at a stretching temperature of 75 to 90° C., at a stretching speed of 60 mm/sec, to obtain a thermo-shrinkable polyester film.

Comparative Example 4

A polyester resin chip was obtained by the same method as Preparation Example 1, except that as the diol components, 20 moles of 1,4-cyclohexanedimethanol, and 80 moles of ethyleneglycol were used.

The polyester resin chip was molten at 260 to 290° C., and extruded from a T die, and then, quenched in a cooling roller to obtain a non-stretched film. The obtained non-stretched film was stretched 3 to 6 times in a transverse direction at a stretching temperature of 75 to 90° C., at a stretching speed of 60 mm/sec, to obtain a thermo-shrinkable polyester film.

Experimental Example: Measurement of Properties of Thermo-Shrinkable Polyester Film The properties of the thermo-shrinkable films obtained in Examples and Comparative Examples were measured as follows, and the results are shown in the following Table 1.

(1) Glass Transition Temperature (Tg)

In order to assess heat resistance, the thermo-shrinkable film was annealed at 300° C. for 5 minutes, and cooled to room temperature, and then, Tg was measured at $2^{nd}$ Scan, at a temperature raising rate of 10° C./min.

(2) Light Transmittance

Using a UV/Vis spectrometer, maximum light transmittance (%) at a wavelength of 360 nm or less and light transmittance (%) at a wavelength of 400 nm were respectively measured.

(3) Delta E

After exposure to UVA (320~400 nm) wavelength for 500 hours, delta E was measured using a UV/vis spectrometer (Delta E is a measure of color change, and increases as color change is larger).

(4) Thermal Shrinkage

The thermo-shrinkable film was cut out to 10 cm×10 cm square, and immersed in hot water of the temperature described in the following Table 1 (65° C. and 95° C.) for 10 seconds under no-load condition to thermally shrink, and then, immersed in hot water of 25° C. for 10 hours. And then, the lengths of the machine direction and transverse direction of the specimen were measured, and thermal shrinkage was calculated according to the following Equation.

Thermal shrinkage (%)=100×(length before shrink−length after shrink)/(length before shrink)

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Tg (glass transition temperature, ° C.) | | 68 | 69 | 69 | 71 | 71 | 77 | 78 |
| Transmittance at 360 nm or less (%) | | 2 | 1 | 2 | 43 | 41 | 42 | 43 |
| Transmittance at 400 nm (%) | | 71 | 70 | 69 | 67 | 68 | 67 | 67 |
| Delta E (exposure for UVA 500 hours) | | 0.5 | 0.6 | 0.5 | 10 | 13 | 12 | 14 |
| Thermal shrinkage (%) | MD @65° C. | 3 | 4 | 4 | 3 | 4 | 7 | 10 |
| | TD @65° C. | 32 | 33 | 30 | 25 | 26 | 5 | 4 |
| | MD @95° C. | 5 | 5 | 6 | 5 | 6 | 7 | 7 |
| | TD @95° C. | 75 | 79 | 78 | 75 | 77 | 60 | 65 |

From the Table 1, it can be seen that the thermo-shrinkable polyester films prepared according to Examples 1 to 3 exhibit glass transition temperature of 65° C. or more, thus having excellent heat resistance. It was also confirmed that the thermo-shrinkable polyester films have shrink onset temperature of 65° C. or less, and exhibit maximum shrinkage at 95° C. of 75% or more, and thus, have very excellent thermal shrinkage.

Therefore, it is expected that if the thermo-shrinkable polyester film according to the present invention is used as a thermo-shrinkable label, it can be thermally shrunken at low temperature, and thus, is favorable in terms of energy saving, and yet, has high maximum shrinkage of about 70~90%, affording high degree of freedom of design, and thus, is useful in the industrial application. It is also expected that since the thermo-shrinkable polyester film comprises a resin layer including a UV absorber, it can prevent spoilage of the contents protected by the thermo-shrinkable film due to excellent UV shielding capacity, and has little color change, thus exhibiting excellent appearance.

Thus, it can be seen that the multilayered thermo-shrinkable polyester film according to the present invention is usefully applied for medical or functional products requiring UV shielding function and prevention of modification or shrinking of films.

Although specific embodiments of the invention have been described in detail, it would be obvious to one of ordinary knowledge in the art that such specific technologies are only preferable practice embodiments and the scope of the invention is not limited thereto. Thus, the substantive scope of the invention is defined by attached claims and equivalents thereof.

What is claimed is:

1. A thermo-shrinkable polyester film comprising
a first resin layer comprising a first polyester resin; and
a second resin layer comprising a second polyester resin and a UV absorber, formed on at least one side of the first layer,
wherein the first and second polyester resins each independently comprise residues of dicarboxylic acid components comprising an aromatic dicarboxylic acid, and residues of diol components comprising between 0.1 mol % and 20 mol % 4-(hydroxymethyl)cyclohexylmethyl 4'-(hydroxymethyl) cyclohexanecarboxylate, between 0.1 mol % and 20 mol % 4,4-(oxybis(methylene)bis)cyclohexane methanol, between 0.1 mol % and 15 mol % 1,4-cyclohexanedimethanol, between 1 mol % and 20 mol % diethylene glycol, and between 30 mol % and 95 mol % ethylene glycol, based on 100 mol % of the dicarboxylic acid component,
wherein the UV absorber includes at least one compound selected from the group consisting of benzotriazole, benzophenone, salicylate, cyanoacrylate, oxanilide, and hindered amine light stabilizer (HALS),
wherein a content of the UV absorber in the second resin layer is between 0.1 wt % and 3 wt %,
wherein the film has a light transmittance at a wavelength of 360 nm or less of 10% or less, a light transmittance at a wavelength of 400 nm of 69% or more, and a delta-E value of 1 or less when exposed to ultraviolet light having a wavelength between 320 nm and 400 nm for 500 hours, and
wherein the film has a shrink onset temperature of 65° C. or less maximum thermal shrinkage at 65° C. of less than 50%, and maximum thermal shrinkable at between 90° C. and 100° C. of between 55% and 90%.

2. The thermo-shrinkable polyester film according to claim 1, wherein the residues of diol components further comprise residues of at least one compound selected from the group consisting of 1,4-cyclohexanedimethanol, diethyleneglycol and ethyleneglycol.

3. The thermo-shrinkable polyester film according to claim 1, wherein the aromatic dicarboxylic acid includes at least one compound selected from the group consisting of terephthalic acid, isophthalic acid, and naphthalenedicarboxylic acid.

4. The thermo-shrinkable polyester film according to claim 1, wherein the second resin layer further comprises at least one additive selected from the group consisting of an antioxidant, a heat stabilizer, a release agent, an agent for applying electrostatic force, an anti-sticking agent and an impact modifier.

5. The thermo-shrinkable polyester film according to claim 1, wherein the film has a thickness of 10 μm to 1 mm.

6. The thermo-shrinkable polyester film according to claim 1, wherein the film is prepared by extrusion blowing of polyester resin, or stretching 3 to 6 times in a TD(Transverse Direction) using a stretching and extruding machine.

* * * * *